(12) United States Patent
Ichimura

(10) Patent No.: US 6,917,718 B2
(45) Date of Patent: Jul. 12, 2005

(54) PROCESS FOR MAKING IMAGES DEFOCUSED

(76) Inventor: Yasuumi Ichimura, 2-18-12-402 Umezato, Suginami-ku, Tokyo (JP), 166-0011

(*) Notice: Subject to any disclaimer, the term of this patent is extended or adjusted under 35 U.S.C. 154(b) by 503 days.

(21) Appl. No.: 09/772,532

(22) Filed: Jan. 28, 2001

(65) Prior Publication Data

US 2001/0016082 A1 Aug. 23, 2001

(30) Foreign Application Priority Data

Feb. 1, 2000 (JP) ........................................ 2000-100042

(51) Int. Cl.[7] .............................................. G06K 9/40
(52) U.S. Cl. ....................... 382/264; 382/252; 382/298; 382/205
(58) Field of Search ................................ 382/205, 252, 382/264, 298, 2

(56) References Cited

U.S. PATENT DOCUMENTS 6,201,613 B1 * 3/2001 Zhang et al. ................ 358/1.9
6,292,167 B1 * 9/2001 Throup ........................ 345/589
6,480,300 B1 * 11/2002 Aoyama ...................... 356/1.9

OTHER PUBLICATIONS

Potmesil, M. and Chakravarty, I. "A Lens and Aperture Camera Model for Synthetic Image Generation". Computer Graphics (Proc. SIGGRAPH), 15(3):297–305, Aug. 1981.*

* cited by examiner

Primary Examiner—Andrew W. Johns
Assistant Examiner—Patrick Edwards

(57) ABSTRACT

This invention produces a realistic defocused image, without using traditional ray tracing technique, by correctly converting the scale of original pixels to the linear scale of amount of light and summing up defocused disks of every pixel in an original image. The result of this process is bright and sparking defocused disks of bright spots previously only possible with rays tracing technique and completely missing in conventional imaging software. This invention enables a personal user to create defocused images in order to create and increase the sense of field depth, which is an important part of daily photographic and imaging work. The input image can be scanned data from photographic films, data from digital cameras, or computer generated images after three-dimensional rendering. A user can control how the scale of pixel is converted to amount of light, which is equivalent to altering film characteristics, and also can change the shape of an aperture in order to make the defocusing effects meet his or her artistic taste.

5 Claims, 4 Drawing Sheets

PROCESS FOR MAKING IMAGES DEFOCUSED

CROSS-REFERENCE TO RELATED APPLICATIONS

Not applicable

BACKGROUND OF THE INVENTION

1. Field of the Invention

This invention relates to a software process which creates or increases the sense of field depth of an existing two-dimensional image by defocusing the image.

2. Description of the Related Art

Producing a realistic two-dimensional image has been one of the important fields of image processing. An image which is in good focus is an important part of reality, but having the image in good focus is not enough. When looking at a two-dimensional image, an object which was originally a three-dimensional object often looks realistic because surrounding objects are blurred or out of focus, creating a sense of field depth. Unrealistic images can occur in two situations. First, unrealistic images occur when a computer generates images through three-dimensional rendering, and there is no information on camera optics available. Without camera optics, objects cannot be defocused and realistic images cannot be constructed. A second situation in which unrealistic images occur is when the focal depth of the camera is very deep, as is often seen with recent digital cameras because the optics of these cameras have very short focal length. All areas of an image produced by digital cameras are often in focus, resulting in very poor sense of field depth.

Light ray tracing is the straight approach to defocus images for computer generated three-dimensional objects. There have been several such works or inventions, including U.S. Pat. No. 5,986,659 to Gallery et al., U.S. Pat. No. 6,028,606 to Kolb et al., and U.S. Pat. No. 4,731,864 to Modla. These are based on a light-ray tracing process that simulates light rays emitted from an object and passing through a camera lens, aperture (sometimes called stop or iris), shutter, and films. In such a ray tracing process, as well as in actual optics, if a very small spot such as a star becomes defocused, it just looks like a disk over which the original amount of light is uniformly distributed. The shape of the disk is identical to the shape of a camera aperture. The original spot is defocused to a disk with its edge sharply defined. This disk may be called a defocused disk. The size of the disk depends on the distance between an emitted point and the camera optics. If the image is more focused, the size of the disk becomes smaller. A defocused image is a summation of the defocused disks from all points or pixels. Often, the defocused disks from bright points remain seen as disks after the summation, giving a good sense of field depth. These simulations reproduce such defocused disks, although their processes are very detailed and precise, therefore costing a significant amount of computing time. Such disks are valuable to study or design a camera or an optical system, but extravagant in providing a good sense of field depth to the human eye.

For images taken with a digital camera or images taken with deep focal depth, people sometimes try to use existing software products to improve the sense of field depth. None of them, however, reproduce the defocused disks essential for sensing field depth, as mentioned above. In these products, such as Adobe System Inc.'s Photoshop or Jasc Software Inc.'s Paint Shop Pro, defocusing images is often misunderstood as Gaussian blurring or other types of blurring. Gaussian blurring distributes light according to Gaussian distribution and does not produce the defocused disks.

To make matters worse, these products apply their numerical operation on a pixel value itself, not on the amount of light. This is a very serious misunderstanding in this field. The value stored in a pixel of an image corresponds to the density of photographic films or to the sensitivity of human eyes, both of which are the amount of light not in linear scale, but in logarithmic scale. Actual physical processes, on the contrary, require operation on the amount of light in linear scale. One photon plus one photon is two photons and one unit of light-energy plus one unit of light-energy is two units of light-energy. Thus, if the scale is logarithmic, the result is indeed invalid. Since the defocusing-operation of the straight approach is applied directly to a pixel value, the results are invalidly and unrealistically produced defocused images. The film or human eyes have a limited dynamic range for a large amount of light. These situations become most apparent when the characteristics of films or human eyes are correctly handled. If the amount of light is very large, saturation in sensitivity occurs, and the light appears just white in films or eyes. Consider a datum in a pixel for bright light, for example, such as 253 or 254 in eight-bit range (0 to 255). The difference of just one digit in this brightest range may amount to ten times or more difference in the amount of light (energy or number of photons) in the real world. If a software process does not account for the real amount of light and creates a defocused image, the effect is completely underestimated, resulting in a very unrealistic look. In such a case, a bright spot in an image spreads only a slightly brighter blur to surrounding pixels. A bright point in a realistic image should spread as a sparkling defocused disk to surrounding pixels as actually seen in real photography.

All the software processes heretofore known suffer from one or more of the following disadvantages:

(1) Light-ray tracing software costs computing time.

(2) Existing image-processing products do not produce correct defocused images. They cannot produce the defocused disks which are the essential part of defocused images as actually seen in the real world.

(3) Existing image-processing products do not treat the amount of light correctly. The summation of amount of light should be taken in linear space, not in logarithmic scale.

SUMMARY OF THE INVENTION

In accordance with the present invention, a software process comprises converting an amount of light in logarithmic scale to linear scale if necessary, spreading light into a shape of aperture to create defocused disks, summation of the defocused disks from all pixels, and converting the amount of light back to logarithmic scale.

Objects and Advantages

Several objects and advantages of the present invention are:

(a) to provide a software process which can produce realistic defocused images without tracing light-rays to reduce computing time;

(b) to provide a software process which can produce appealing defocused images by directly producing the defocused disks that are the most important part defocused images; and (c) to provide a software process which can produce realistic defocused images by treating the amount of light correctly in its process.

Further objects and advantages are to provide a software process which allows to change the shape of aperture (sometimes called stop or iris) to emulate actual apertures in existing cameras for special effects that may be desired, to provide a software process which allows. the effect of color aberration by having color-dependent aperture information, and to provide a software process which allows modification of the transformation characteristic between logarithmic pixel datum and linear amount of light for creating additional artistic effects.

BRIEF DESCRIPTION OF THE DRAWINGS

In the drawings, closely related figures have the same number, but different alphabetic suffixes.

DETAILED DESCRIPTION OF THE PREFERRED EMBODIMENTS

Figure 1:
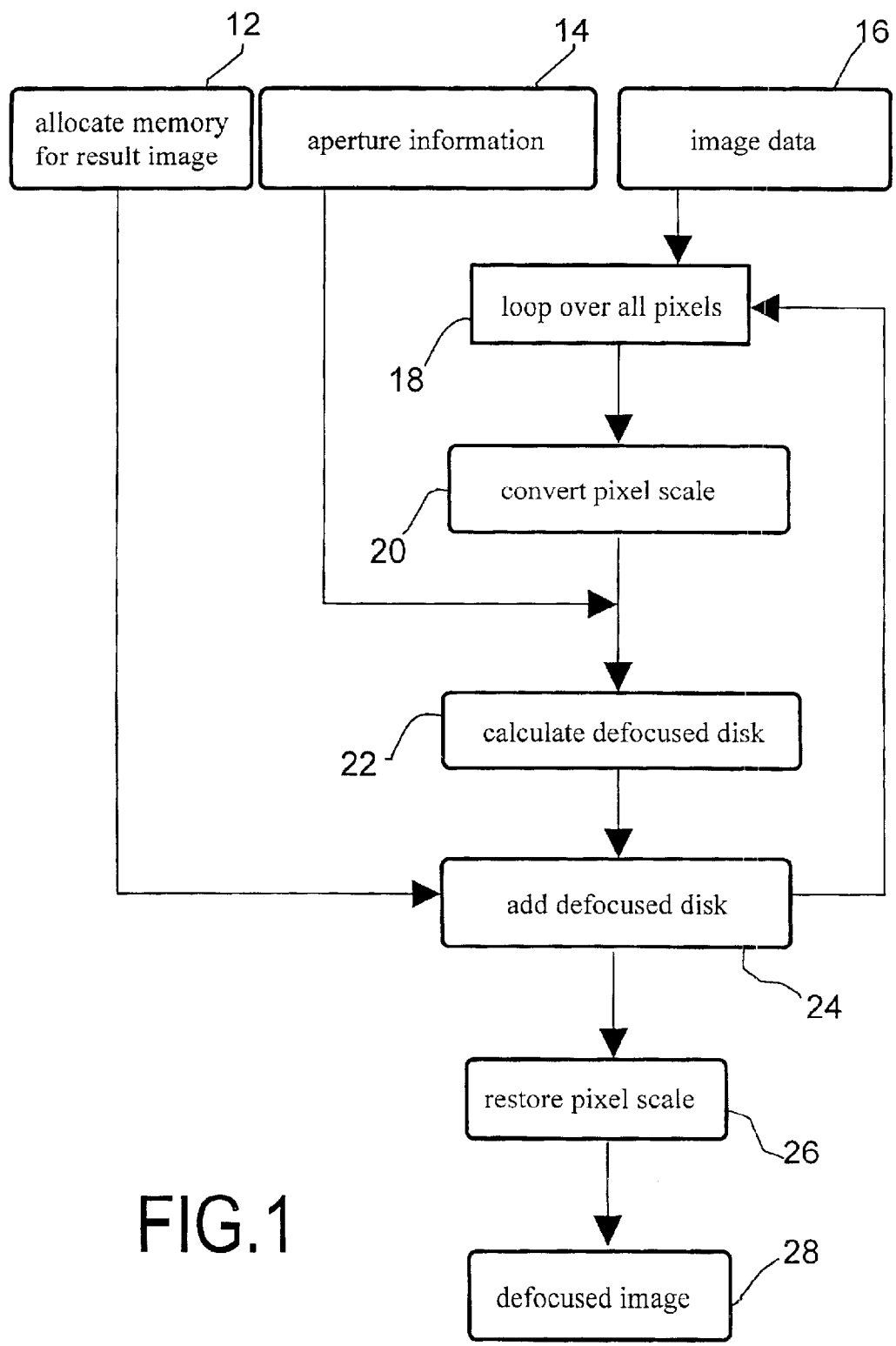
FIG. 1 is a block diagram of this invention.

FIG. 1—Block Diagram

FIG. 1 shows a block diagram of the present invention. In computer memory, the process stores three sets of input data, an original color image 16, aperture data 14, and an empty color image 12 to be used for a resulting final defocused image 28. The original color image 16 may be stored as a file on a computer or transmitted from elsewhere to the computer. The image 16 is then read into an area of computer memory and may be shown on a computer display. The image 16 consists of data for each color and optionally may carry distance information for each pixel. The aperture information 14 may also be a file on the computer, or transmitted from elsewhere to the computer, and is then read into an area of computer memory. The aperture information 14 could be a bitmap image of arbitrary size with a number of pixels large enough for calculating defocused disks, or may be vector data or mathematic representation alternatively used for calculating defocused disks. The empty color image 12 is an area of memory on the computer whose value is set to be zero, to which defocused disks are added on to make a final defocused image 28.

Figure 2:
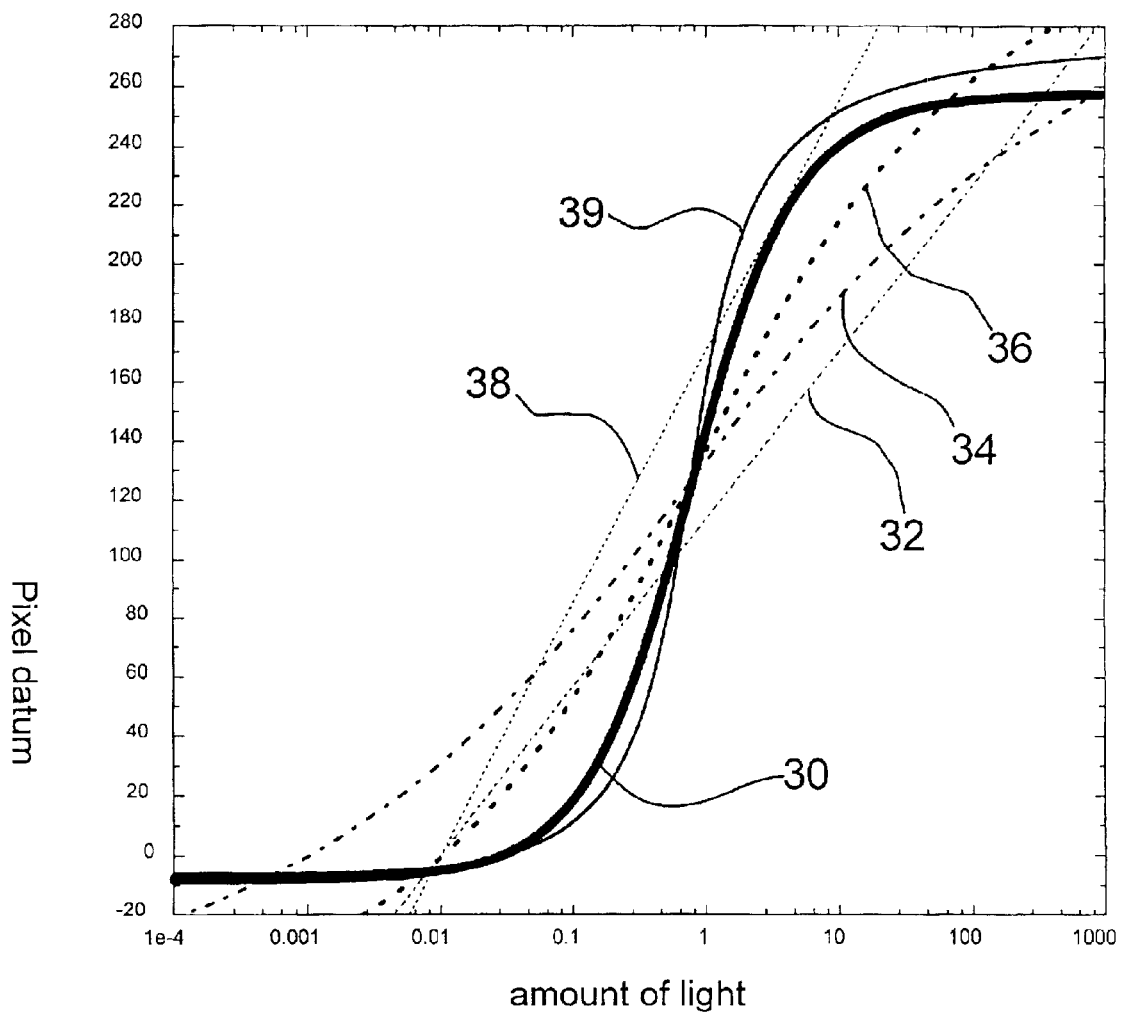
FIG. 2 shows the transformation curves between a pixel datum, which is in logarithmic, and amount of light, which is in linear scale.

A box 20, labeled as "convert pixel scale", represents a conversion of the scale of pixel data to linear scale corresponding to correct amount of light. The scale of pixel data in the image 16 is typically in logarithmic scale in terms of amount of light, or may be some similar scale to logarithmic. The pixel data may be density recorded in photographic films or digitized data in a digital camera, where the scaling is similar to that of photographic films. The relation of the two scales, often called a characteristic curve or transformation function, is shown in FIG. 2 and described in the next section.

A defocused image is created by spreading light-data over surrounding pixels according to the shape of a given aperture, provided in aperture information 14. This takes place in a box 22, labeled "calculate defocused disk". The total amount of light in box 22 is conserved but equally distributed to an area determined by a given aperture shape 14.

A box 24, "add defocused disk" denotes that each defocused disk, which is produced from each original pixel, is co-added to a resulting image 12.

After defocused disks from the all pixels are co-added, the resulting image is complete but the scale of pixel value is in linear scale (amount of light) which is not suitable for viewing with human eyes. A box 26, "restore pixel scale", converts the linear pixel scale to original logarithmic scale inversely, using the characteristic curve described in FIG. 2. The final defocused Image 28 may be displayed on a computer display by transferring the data to image memory, stored as a data file on an external storage, or directly transferred to other locations over a network.

FIG. 2—Characteristic Curve

Typical relations between a pixel datum and amount of light are shown as curves in FIG. 2, often called characteristic curves. Pixel datum is plotted against amount of light for some typical relations in FIG. 2. The value of a pixel datum is expressed with eight bits ranging from 0 to 255 for each color, which is very typical in a computer. The axis for amount of light is in logarithmic scale. The unit of amount of light here is arbitrary. It is a multiple of physical energy or number of photons.

The thick solid curve 30 in FIG. 2 is one of the characteristic curves of actual photographic films provided by Fuji Photo Film, Inc. In this case, the pixel datum represents the image density on the film. The middle part of the curve 30 is nearly straight, indicating the pixel datum is approximately in logarithmic scale in terms of amount of light. The curve 30 in detail, however, does not fit within the range of eight bits as shown in FIG.2, where the curve 30 goes slightly below 0 or above 255. The most important of the film characteristics is its behavior for a very small amount of light and for a very large amount of light. The density does not become exactly zero easily for low light levels, as seen in the lower left part of the curve running nearly horizontally to the left. At high light levels, the density does not become completely opaque easily, as seen in the upper right part of the curve running nearly horizontally to the right. The latter behavior is very important to create a realistic image in and out of focus. When an image is in focus, a bright spot in the image occupies very small area, but in terms of amount of light, it can have 10 to 100 times more than surrounding pixels. When the image becomes defocused, this large amount of light on this spot spreads over the surrounding pixel, resulting in significant effects. This is one of the reasons why existing software products are incapable of creating realistic defocused images. They do not convert pixel data to amount of light; therefore the effect of a bright spot is completely underestimated. Even if the data come from a digital camera, this conversion is necessary because manufactures of digital cameras often use characteristic curves similar to those of photographic films. The other curves in FIG. 2, thin solid line 39, dotted line 38, dash-dotted line 34 and two-dash dotted line 32, represent exaggerated examples where the user wants to create more artistic effects than actual physical process.

Figure 3A:
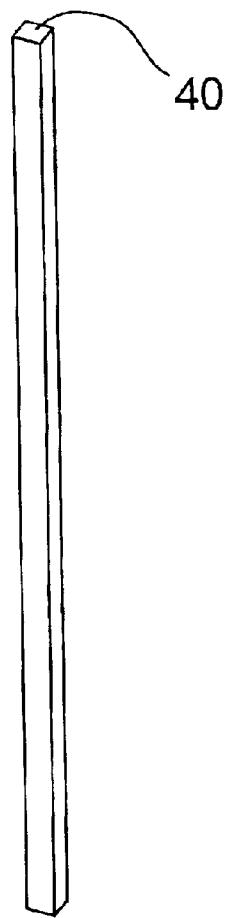
FIGS. 3A and 3B illustrate how a pixel datum in an original image is defocused or spread over neighbor pixels in the case of a pentagonal aperture.
Figure 3B:
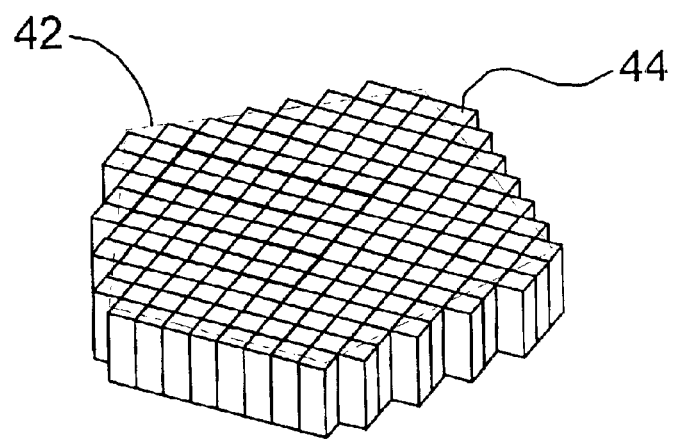

The most important part of defocused image visually is a defocused disk. After a pixel datum is converted to linear amount of light, it is spread or allocated to surrounding pixels within the area whose shape is determined from a shape of a given aperture, with total amount of light conserved. Such case for a pentagon aperture 42 is illustrated in FIGS. 3A and 3B. The height of each column represents amount of light. Initial datum in a pixel is illustrated in FIG. 3A as a single column 40. Through our software process, the amount of light is spread or allocated to surrounding pixels as shown in FIG. 3B where the shape of assumed aperture 42 is pentagonal. All of spread or allocated pixels have the same height that is equal to the original height of 40 divided by the number of pixels in 44. We call a resulting spread area a defocused disk. The size of a defocused disk is determined by a user depending on his/her needs or by the distance information associated with a given pixel. Although FIGS. 3A and 3B show illustrations for a single initial pixel, this process is applied to all pixels in an image. A defocused image is the summation of all of the defocused disks.

Figure 4A:
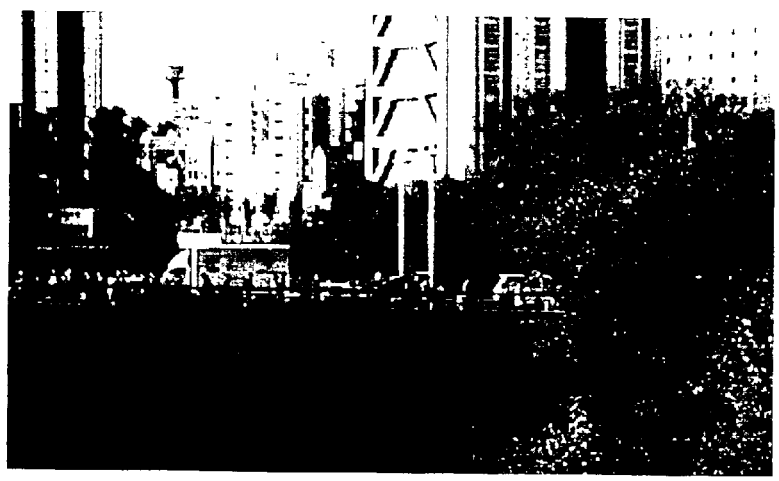
FIGS. 4A, 4B, and 4C show examples of an image before this software process, as a result of this process with a pentagonal aperture, and as a result of "Gaussian Blur," respectively. The images are arranged for comparison purposes.
Figure 4B:
Figure 4C:

FIGS. 4A–4C—Sample Image and Comparison

Sample results of this invention are shown in FIG. 4B with a comparison to one of existing software products in FIG. 4C. FIG. 4A is an image before applying this software process. The image is printed in black and white for application purposes, but was originally printed in color. FIG. 4B is a resulting image after this software process with a pentagon aperture, while FIG. 4C is the image created by application of the "Gaussian blur" feature of Adobe Systems Inc.'s Photoshop, which is the most popular product used for processing digital images. The most striking difference between the images is that defocused disks are seen in FIG. 4B, but not in FIG. 4C. The Gaussian blur simply blurs a pixel according to a Gaussian distribution, which is not what actually happens in real optics. In optics, a defocused image is produced by defocused disks determined by an aperture, which is sometimes called an iris or stop in optics. That is what is seen in FIG. 4B. Another feature seen in FIG. 4B is that these defocused disks are very bright and sparkling. This is because this invention correctly computes the amount of light to be spread by converting pixel data to amount of light in linear scale.

Advantages

From the description above, a number of advantages of the software process for defocused images become evident:

(a) The direct use of an aperture shape for a defocused disk will reduce the amount of computing time substantially compared to existing light ray tracing software processes. The reduction of computing time will permit casual use of this software process among many end-users who own only limited computer resources.

(b) The ability to change aperture shapes enables artistic visual effects in defocused images, depending on the artistic taste of the user, since the software process is not based on ray tracing of existing camera optics. A user can change an aperture shape to whatever shape he/she likes without significantly increasing computing time, which would be required in the case of the ray tracing software process for a complex shape.

(c) The use of a different aperture shape for each color can mimic a color aberration of optical lenses without increasing computing time, as in the case of ray tracing. This can be very useful for creating an artistic effect appealing to human eyes.

(d) The conversion of pixel data in logarithmic scale to linear scale before computing defocused disks can provide realistic visual effects of bright sparkling defocused disks, which are an essential part of a defocused image but completely missing in the prior software processes.

(e) Modification of the scale conversion in the previous advantage will permit an effect which does not exist in the real world, but is very useful for artistic expression.

Operation

This software process first allocates memory for three types of images, an input image 16 to be defocused, aperture information 14, and an output image 12. The allocation can be done in a conventional way on a computer. The input image data 16 may reside on a data-storage device such as a hard disk or data tape, or elsewhere on the network. The input image data can be black-and-white data or color data. The input image data may be a result of scanning a photographic film, digital data already stored on a digital camera, or a result of software image generation. The data is then read into the memory for further processing by the computer. The contents of memory allocated for the output image 12 are all set to be zero at the beginning. The aperture information 14 can be either a bitmap image similar to the input image 14 or a mathematical formula representing the shape of the aperture. The aperture information 14 can be different for each color if a user wants to create an effect similar to the color aberration.

At the box 18 labeled "loop over all pixels" in FIG. 1, the process initiates a loop operation over the pixels of the input image. In the loop, each pixel is processed and a defocused disk is added to the output image until all the pixels are processed. The scale of datum in each pixel of the input image is converted linear scale at box 20. The scale of input pixel data is often in logarithmic scale or a scale very similar to that. The conversion shown in the box labeled 20 is always necessary for scanned data and data from a digital camera. If the pixel data comes from a computer-generated image, such as a result from three-dimensional rendering, the scale of the pixel data may be linear in terms of amount of light. In this case, the conversion shown in box 20 may be skipped. The conversion is done using the characteristic curve whose examples are shown in FIG. 2. The nominal choice of the characteristic curve is the curve 30 for photographic film, but this may be altered or changed depending on artistic taste.

After the scale conversion at box 20, the data is uniformly distributed to a defocused disk at a box 22 as illustrated in FIGS. 3A and 3B. The shape of a defocused disk is determined from the aperture information 14. The size of a defocused disk is determined by a user or it can be computed from distance information attached to the pixel. Based on the shape and size, the pixel addresses of a defocused disk in the output image 12 are determined. Each pixel of a defocused disk has a value equal to the converted linear value of an input pixel divided by the number of pixels that a defocused disk occupies. Each pixel value of a focused disk is added to a corresponding address of the output image 12. Thus, a defocused disk is calculated for each input pixel and added to a memory area of the output image.

The process then goes to a next input pixel, converts it to linear scale, calculates a defocused disk, and adds the disk data to the output image. The process repeats this loop until all input pixels are processed. At this point, the resulting defocused image still has all of data in linear scale. At the box marked "restore pixel scale" 26, the scale of the pixel data in the output image is converted back to logarithmic-like scale using the same characteristic curve at box 20 in the reverse way. The final defocused image may be displayed on a computer screen, saved as an image file on a data storage, or transferred to another location over a network.

CONCLUSION, RAMIFICATIONS, AND SCOPE

Accordingly, the software process of this invention can be used to create realistic defocused images without using a large amount of computing time. A defocused image created by this process correctly has defocused disks actually seen in real photographs. These disks are beautifully seen for a bright spot creating a realistic look of a defocused image and giving a good sense of field depth. It can be seen that this software process is useful to increase or restore the field depth of images taken with recent digital cameras with affordable computer resources.

Furthermore, the software process has an additional advantage in that:

it permits control on the aperture shape and size;

it permits modification or altering of the characteristic curve; and it permits emulation of color aberration.

Although the description above contains many specifications, these should not be constructed as limiting the scope of the invention but as merely providing illustrations of some of the presently preferred embodiments of this invention.

Thus, the scope of the invention should be determined by the appended claims and their legal equivalents, rather than by the example given.

What is claimed is:

1. A method of creating a defocused image from an input image, comprising:
   (a) receiving an input image including a plurality of pixel data;
   (b) selecting one pixel data from said plurality of pixel data;
   (c) converting said selected pixel data from a predetermined scale to a linear scale to generate light data having some light amount;
   (d) allocating said light data to surrounding pixels on or within a boundary whose shape is determined from a shape of an aperture to generate a defocused disk image having a set of allocated light data so that each allocated light data is equal to each other and a total light amount of said defocused disk image becomes equal to the light amount of said light data; and
   (e) repeating (b) through (d) for all pixel data included in said input image to create a defocused image.

2. The method according to claim 1, further comprising:
   converting a scale of said defocused disk image back to said predetermined scale.

3. The method according to claim 1, further comprising:
   determining whether said input image is represented in said linear scale, pixel data of said input image having light data having some light amount; and
   skipping (b) if said input image is already represented in linear scale.

4. The method according to claim 1, further comprising:
   determining said size of said defocused disk image based on distance information of said selected pixel data,
   wherein said light data is allocated to surrounding pixels on or within a boundary whose shape is determined from a shape of an aperture to generate said defocused disk image based on said size of said defocused disk image.

5. A computer program, stored on a computer readable medium, for creating a defocused image from an input image, comprising:
   (a) program code to receive an input image including a plurality of pixel data;
   (b) program code to select one pixel data from said plurality of pixel data;
   (c) program code to convert said selected pixel data from a predetermined scale to a linear scale to generate light data having some light amount;
   (d) program code to allocate said light data over surrounding pixels on or within a boundary whose shape is determined from a shape of an aperture to generate a defocused disk image having a set of allocated light data so that each allocated light data is equal to each other and a total light amount of said defocused disk image becomes equal to the light amount of said light data; and
   (e) program code to repeat the processes of program code (b) through (d) for all pixel data included in said input image to create a defocused image.

* * * * *

UNITED STATES PATENT AND TRADEMARK OFFICE
CERTIFICATE OF CORRECTION

PATENT NO. : 6,917,718 B2  
DATED : July 12, 2005  
INVENTOR(S) : Yasuumi, Ichimura It is certified that error appears in the above-identified patent and that said Letters Patent is hereby corrected as shown below:

Title page,  
Item [56], References Cited, U.S. PATENT DOCUMENTS,  
delete "356/1.9" and insert -- 358/1.9 --;  
Item [57], ABSTRACT,  
Line 7, delete "rays" and insert -- ray --.

Signed and Sealed this

Twenty-fifth Day of April, 2006

JON W. DUDAS  
*Director of the United States Patent and Trademark Office*